… … …

United States Patent Office 3,359,179
Patented Dec. 19, 1967

3,359,179
SYNTHESIS OF STEROIDS
Patrick A. Diassi, Westfield, and Pacifico A. Principe, South River, N.J., assignors, by mesne assignments, to E. R. Squibb & Sons, Inc., New York, N.Y., a corporation of Delaware
No Drawing. Original application Mar. 23, 1965, Ser. No. 442,203, now Patent No. 3,316,281, dated Apr. 25, 1967. Divided and this application Sept. 27, 1966, Ser. No. 612,061
2 Claims. (Cl. 195—51)

ABSTRACT OF THE DISCLOSURE

Procedure for preparing $4\alpha,8,14$-trimethyl-18-nor-$5\alpha,8\alpha,9\beta,14\beta$-androst-1-en-3,11,17-trione and $4\alpha,8,14$-trimethyl-17-hydroxy-18-nor-$5\alpha,8\alpha,9\beta,14\beta$-androstane-3,11-dione utilizing *Fusarium javanicum* in the substrate.

Synthesis of steroids

This application is a divisional application of our application, Ser. No. 442,203, filed Mar. 23, 1965, now U.S. Patent No. 3,316,281.

This invention relates to and has for its object the provision of new physiologically active compounds, and more particularly, compounds selected from the group consisting of $4\alpha,8,14$-trimethyl-18-nor-$5\alpha,8\alpha,9\beta,14\beta$-androst-1-en-3,11,17-trione and $4\alpha,8,14$-trimethyl-17-hydroxy-18-nor-$5\alpha,8\alpha,9\beta,14\beta$-androstane-3,11-dione.

The novel compounds of this invention are pharmacologically active substances and are particularly useful as anti-androgenic, anti-estrogenic and anti-gonadotrophic agents.

The compounds may be formulated for such administration, the concentration and/or dosage being based on the activity of the particular compound and the requirements of the patient.

The final products of this invention are prepared by the process of this invention which entails utilizing $4\alpha,8,14$-trimethyl-18-nor-$5\alpha,8\alpha,9\beta,14\beta$-androstane-3,11,17-trione as the starting reactant. This compound may be prepared by refluxing $4\alpha,8,14$-trimethyl-$16\beta$-hydroxy-18-nor-$5\alpha,8\alpha,9\beta,13\alpha,14\beta$-androstane-3,11,17-trione 16-acetate in the presence of glacial acetic acid and zinc dust.

It has been found that the compounds of this invention can be prepared from the starting reactant by subjecting the latter to the action of a microorganism of the genus Fusarium or to the action of the enzymes thereof under oxidizing and preferably aerobic conditions.

To prepare the compounds of this invention, $4\alpha,8,14$-trimethyl-18-nor-$5\alpha,8\alpha,9\beta,14\beta$-androstane-3,11,17-trione may be first subjected to the action of enzymes of a microorganism of the genus Fusarium under oxidizing conditions. This oxidation can best be effected either by including the starting reactant in an aerobic culture of the microorganism, or by bringing together in an aqueous medium, the compounds, air, and enzymes of non-proliferating cells of the microorganism.

In general, the conditions of culturing the Fusarium microorganism for the purposes of this invention are (except for the inclusion of the starting material to be converted), the same as those of culturing various other microorganisms for the production of antibiotics, vitamin B–12, and other like substances. The microorganism is grown aerobically in contact with, (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composes of simple, synthesizable organic or inorganic compounds, such as ammonium salts, alkali nitrates, amino acids or urea).

An adequate sterile air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of the concentration of the compound in the culture is about 0.01% to about 0.1%. The culture period (or rather the time of subjecting the compound to the action of the enzyme) may vary considerably, the range of about twenty-four to ninety-six hours being feasible, but not limiting.

The microbial process described hereinabove yields the $4\alpha,8,14$-trimethyl-18-nor-$5\alpha,8\alpha,9\beta,14\beta$-androst-1-en-3,11,17-trione and additionally upon further processing, there is obtained $4\alpha,8,14$-trimethyl-17-hydroxy-18-nor-$5\alpha,8\alpha,9\beta,14\beta$-androstane-3,11-dione.

The invention may be illustrated by the following examples, all temperatures are in degrees centigrade unless otherwise stated.

EXAMPLE 1

*$4\alpha,8,14$-trimethyl-18-nor-$5\alpha,8\alpha,9\beta,14\beta$-androstane-3,11,17-trione*

To a solution of 100 mg. of $4\alpha,8,14$-trimethyl-$16\beta$-hydroxy-18-nor-$5\alpha,8\alpha,9\beta,13\alpha,14\beta$-androstane-3,11,17-trione 16-acetate in 10 ml. of glacial acetic acid 200 mg. of zinc dust are added and the mixture refluxed with stirring for three hours. The mixture is filtered and washed with acetic acid. The combined filtrate and washings are then diluted with water and extracted with chloroform. The chloroform is washed with water, evaporated and the residue crystallized from acetone-hexane to give 55 mg. of $4\alpha,8,14$-trimethyl-18-nor-$5\alpha,8\alpha,9\beta,14\beta$-androstane-3,11,17-trione having a melting point about 170–172° C.

EXAMPLE 2

*$4\alpha,8,14$-trimethyl-18-nor-$5\alpha,8\alpha,9\beta,14\beta$-androst-1-en-3,11,17-trione and $4\alpha,8,14$-trimethyl-17-hydroxy-18-nor-$5\alpha,8\alpha,9\beta,14\beta$-androstane-3,11-dione*

Surface growth from each of 2 two-week-old agar slants of *Fusarium javanicum* var. ensiforme (QM–524) (Army Quartermaster, Natick, Mass.), the slants containing as a nutrient medium (A):

| | Grams |
|---|---|
| Glucose | 10 |
| Yeast extract | 2.5 |
| $K_2HPO_4$ | 1 |
| Agar | 20 |
| Distilled water to 1 liter. | | is suspended in 5 ml. of 0.1% aqueous sodium lauryl sulfated solution. One ml. portions of this suspension are used to inoculate eight 250 ml. Erlenmeyer flasks, each containing 50 ml. of the following sterilized medium (B):

| | Grams |
|---|---|
| Dextrose | 10 |
| Cornsteep liquor | 6 |
| NH$_4$H$_2$PO$_4$ | 3 |
| Yeast extract | 2.5 |
| CaCO$_3$ | 2.5 |
| Distilled water to 1 liter. | |

After 24 hours' incubation at 25° with continuous rotary agitation (280 cycles/minute; two inch radius), 10% (v.:v.) transfers are made to forty 250 ml. Erlenmeyer flasks, each containing 50 ml. of freshly sterilized medium B. After 18 hours of further incubation, using the same conditions described above, each flask is supplemented with 300 micrograms/ml. of 4α,8,14-trimethyl-18-nor-5α,8α,9β,14β-androstane - 3,11,17 - trione. The steroid is added by supplementing each flask with 0.25 ml. of a sterile solution of the steroid in N,N-dimethylformamide containing 60 mg./ml. of steroid. A total of 600 mg. is fermented. After 7 days of further incubation, using the same conditions as described above, the contents of the flasks are pooled and filtered through a Seitz clarifying pad. The flasks, mycelium and pad are washed with successive 50 ml. portions of warm water. The combined filtrate and washings have a volume of 2500 ml. They are extracted three times with 800 ml. portions of chloroform which are combined, washed twice with 1 liter portions of water and evaporated, in vacuo. The residue is plate chromatographed on Woelm neutral alumina (Activity V) using chloroform as the developing solvent. The band detectable by UV at $Rf \approx 0.5$ is eluted with ethyl acetate, evaporated and crystallized from acetone-hexane to give 92 mg. of 4α,8,14-trimethyl-18-nor-5α,8α,9β,14β-androst-1-en-3,11,17-trione having a melting point about 205–207° C., $[\alpha]_D^{22}$ —37° (chloroform), $$\lambda_{max.}^{alc.} \ 249 \ m\mu \ (\epsilon, \ 10,270)$$

*Analysis.*—Calc'd for C$_{21}$H$_{28}$O$_3$ (328.46): C, 76.79; H, 8.59. Found: C, 76.70; H, 8.51.

A band detectable with iodine at $Rf \approx 0.8$ is eluted with ethyl acetate, evaporated and crystallized from acetone-hexane to give 89 mg. of 4α,8,14-trimethyl-17-hydroxy-18-nor-5α,8α,9β,14β-androstane-3,11-dione having a melting point about 213–215° C., $[\alpha]_D^{22}$ +37° (chloroform).

*Analysis.*—Calc'd for C$_{21}$H$_{32}$O$_3$ (332.49): C, 75.86; H, 9.70. Found: C, 75.70; H, 9.84.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. A process for the preparation of 4α,8,14-trimethyl-18-nor-5α,8α,9β,14β-androst-1-en-3,11,17 - trione; which comprises subjecting 4α,8,14 - trimethyl - 18 - nor - 5α, 8α,9β,14β-androstane-3,11,17-trione to the action of a microorganism of the species *Fusarium javanicum*.

2. A process for the preparation of 4α,8,14-trimethyl-17-hydroxy-18-nor-5α,8α,9β,14β-androstane - 3,11 - dione which comprises subjecting 4α,8,14 - trimethyl - 18 - nor-5α,8α,9β,14β-androstane-3,11,17-trione to the action of a microorganism of the species *Fusarium javanicum*.

No references cited.

A. E. TANENHOLTZ, *Primary Examiner.*